June 24, 1924.　　　　　　　　　　　　　　　　1,498,627
I. M. HERBST
FLANGED PIPE AND METHOD OF MAKING THE SAME
Filed June 3, 1922

WITNESS
INVENTOR.
I. M. Herbst
BY F. N. Barber
ATTORNEY.

Patented June 24, 1924.

1,498,627

UNITED STATES PATENT OFFICE.

ISAAC M. HERBST, OF PITTSBURGH, PENNSYLVANIA, ASSIGNOR TO ROESSING MANUFACTURING COMPANY, OF SHARPSBURG, PENNSYLVANIA, A CORPORATION OF PENNSYLVANIA.

FLANGED PIPE AND METHOD OF MAKING THE SAME.

Application filed June 3, 1922. Serial No. 565,574.

*To all whom it may concern:*

Be it known that I, ISAAC M. HERBST, a citizen of the United States, residing at Pittsburgh, in the county of Allegheny and State of Pennsylvania, have invented new and useful Improvements in Flanged Pipes and Methods of Making the Same, of which the following is a specification.

My invention relates to flanged pipes and methods of making the same.

The object of this invention is to provide a flanged pipe in which the main body of the pipe is electrically butt-welded directly to a short tubular skirt registering with the pipe opening in the flange and having the walls of the skirt and pipe of equal thickness at their abutting ends.

Figure 1:
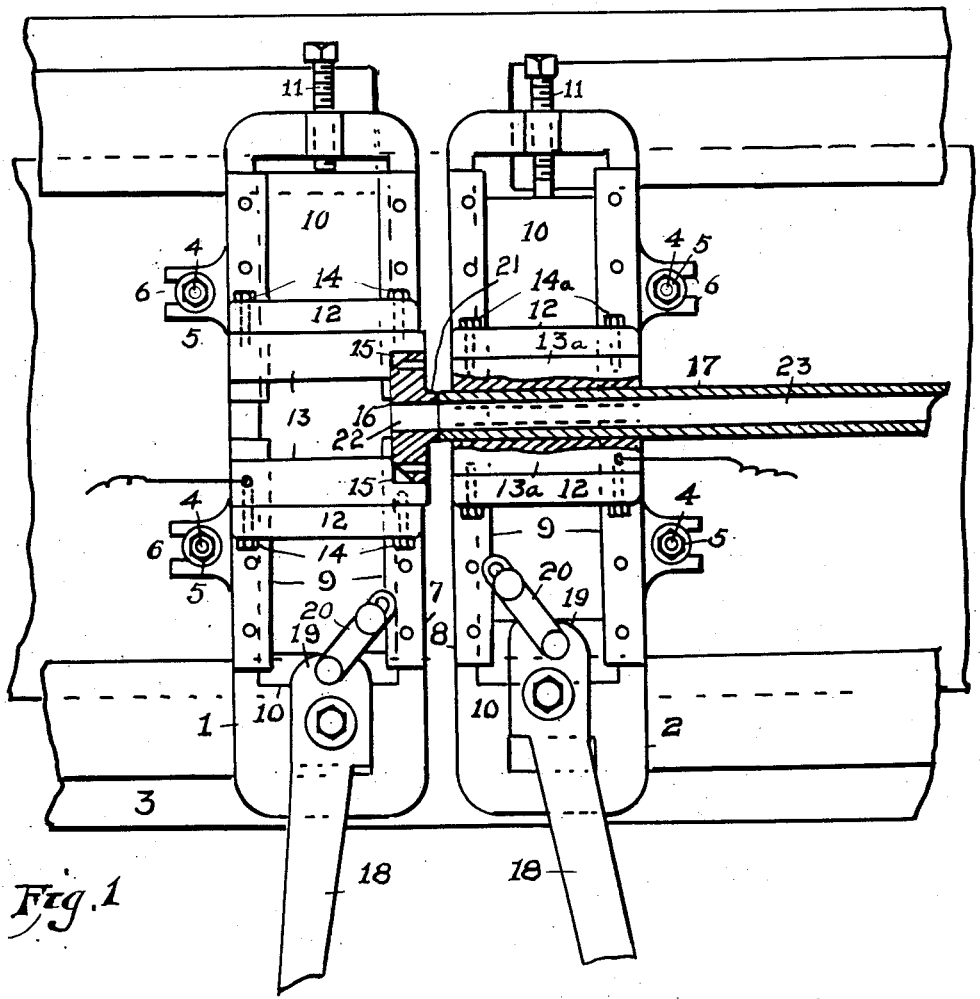
Figure 2:
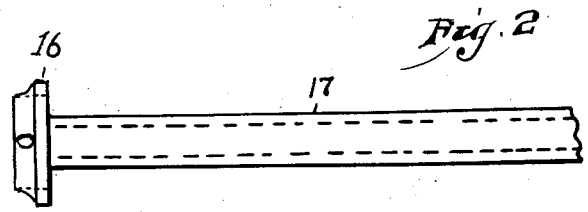

Referring to the accompanying drawing, Fig. 1 is a plan view of a portion of a table containing an apparatus illustrating my invention and Fig. 2, a perspective view of a portion of a pipe made in accordance with my invention.

On the drawing, 1 and 2 designate two parallel substantially rectangular frames adjustably secured on the top of the table 3 by the bolts 4 carried by the table and provided with the nuts 5 which bear on the upper faces of the forks 6 on the outer edges or sides of the frames. The frames are parallel with the top of the table and have their edges or sides 7 and 8 opposing each other. The frames 1 and 2 are open and carry on their sides the guide strips 9 which lie over the four slides 10 guided laterally by the inner faces of the sides of the frames. The slide at one end of each frame is adjusted by a screw 11 working through the end of the frame and against the outer end of the slide. Each slide carries at its inner end a cross-head or bar 12 whose ends travel above the said guides. Each cross-head for the frame 1 carries a welding or clamp jaw 13 on its inner face, the clamps being secured to the cross-heads by the screws 14. The ends of the clamps nearest the frame 2 have opposing notches 15 to receive the pipe-flange 16 so as to support the latter against both longitudinal and transverse movements.

The cross-heads 12 on the frame 2 carry welding jaws 13ª which are secured to the cross-bars by the bolts 14ª. The jaws 13ª receive between them the pipe member 17.

Each frame has a lever 18 having the cam 19 arranged to force the two corresponding slides 10 inwardly, a link 20 being connected from each lever to the adjacent slide to retract the latter.

A pair of jaws 13 is selected which has notches 15 adapted to engage the edge and outer end of the flange 16, and a pair of jaws 13ª is selected to engage and fit the pipe member. The bolts 11 are turned so as to bring the inner end of the pipe member 17 directly opposite the short tubular skirt 21 which is integral with the flange member 16 and has its opening 22 registering with the opening 23 in the member 16, the walls of the skirt and the member 17 being of the same thickness at their opposing ends. The levers 18 are actuated so as to cause the flange and pipe members 16 and 17 to be firmly clamped by the welding jaws. Electric current being applied to the flange and pipe members 16 and 17, one frame 1 or 2 is moved by any suitable means to bring the skirt and pipe member into contact and to increase the pressure of one on the other when the parts to be welded reach a welding heat. When the parts have been properly united, the current is cut off and the welding jaws are opened and the welded flanged tube is removed, whereupon the apparatus is ready for another welding operation.

It has been found impracticable to weld the pipe directly to a pipe-flange without a skirt, as the pipe will be overheated before the thick flange can be brought to a welding heat. By my method the ends of the skirt and pipe member are, owing to their equal diameter and equal wall-thickness, brought simultaneously to the same welding heat. I find that the skirted flange can be readily formed by drop-forging.

I claim—

1. A flanged pipe comprising a tube welded to the tubular skirt of a pipe-flange, the tube and skirt having walls of substantially the same thickness electrically butt-welded together.

2. The process of electrically welding a pipe flange having a tubular skirt to the end of a pipe of substantially the same wall-thickness as that of the skirt, which consists in abutting the end of the pipe against the end of the skirt, and causing electricity to flow across the said abutting ends to weld the same together.

3. The process of electrically welding a pipe flange having a tubular skirt to the end of a pipe of substantially the same wall-thickness as that of the skirt, which consists in abutting the end of the pipe against the end of the skirt, and causing electricity to flow across the said abutting ends to weld the same together and simultaneously pressing the said ends together.

Signed at Pittsburgh, Pa., this 26th day of May, 1922.

ISAAC M. HERBST.